US009976564B2

(12) United States Patent
Bueche et al.

(10) Patent No.: US 9,976,564 B2
(45) Date of Patent: May 22, 2018

(54) MULTI-STAGE RADIAL COMPRESSOR UNIT COMPRISING GAS REMOVAL DURING A COMPRESSOR STAGE

(71) Applicants: Dirk Bueche, Wutoeschingen (DE); George Kleynhans, Buelach (CH); Bob Mischo, Zurich (CH)

(72) Inventors: Dirk Bueche, Wutoeschingen (DE); George Kleynhans, Buelach (CH); Bob Mischo, Zurich (CH)

(73) Assignee: MAN Diesel & Turbo SE, Augsburg (DE)

(*) Notice: Subject to any disclaimer, the term of this patent is extended or adjusted under 35 U.S.C. 154(b) by 741 days.

(21) Appl. No.: 14/386,606

(22) PCT Filed: Feb. 27, 2013

(86) PCT No.: PCT/EP2013/053900
§ 371 (c)(1),
(2) Date: Dec. 11, 2014

(87) PCT Pub. No.: WO2013/139568
PCT Pub. Date: Sep. 26, 2013

(65) Prior Publication Data

US 2015/0086329 A1 Mar. 26, 2015

(30) Foreign Application Priority Data

Mar. 20, 2012 (DE) ........................ 10 2012 204 403

(51) Int. Cl.
*F04D 17/12* (2006.01)
*F04D 29/44* (2006.01)
(Continued)

(52) U.S. Cl.
CPC ................ *F04D 25/16* (2013.01); *F02C 6/08* (2013.01); *F04D 17/12* (2013.01); *F04D 17/122* (2013.01);
(Continued)

(58) Field of Classification Search
CPC .................................................... F04D 29/4806
See application file for complete search history.

(56) References Cited

U.S. PATENT DOCUMENTS 2,332,614 A * 10/1943 Swearingen .......... F04D 29/063 184/6.16
4,969,803 A 11/1990 Turanskyj
(Continued)

FOREIGN PATENT DOCUMENTS

DE 37 29 486 C1 12/1988
DE 10 2007 019 264 A1 11/2008
(Continued)

*Primary Examiner* — Logan Kraft
*Assistant Examiner* — Jason Davis
(74) *Attorney, Agent, or Firm* — Cozen O'Connor

(57) ABSTRACT

A radial compressor unit for compressing gas has several compressor stages. Each compressor stage includes an impeller having rotor blades, and a flow channel arranged downstream of the impeller, as viewed in the flow direction of the gas to be compressed, having a diffusor section, a deflection section, and a recirculation section having guide blades. The gas compressed in a compressor stage can be removed as cooling gas for cooling a component to be cooled, and can be conveyed in the direction of the component to be cooled. The cooling gas can be removed adjacent to an intermediate wall of the compressor stage from the deflection section and/or the recirculation section of the flow channel of the compressor stage.

1 Claim, 2 Drawing Sheets

24/26
37
11
35
36
32
29
31
28
24/25
30
24/27
31
23
31
18
31

(51) Int. Cl.

| | |
|---|---|
| ***F04D 29/58*** | (2006.01) |
| ***F02C 6/08*** | (2006.01) |
| ***F04D 25/16*** | (2006.01) |
| ***F04D 23/00*** | (2006.01) |
| ***F04D 25/06*** | (2006.01) |

(52) U.S. Cl.

CPC ........... *F04D 23/008* (2013.01); *F04D 25/06* (2013.01); *F04D 29/444* (2013.01); *F04D 29/5806* (2013.01)

(56) References Cited

U.S. PATENT DOCUMENTS

| | | | | |
|---|---|---|---|---|
| 6,129,524 | A * | 10/2000 | Woollenweber ........ | F04D 17/12 417/366 |
| 6,210,104 | B1 * | 4/2001 | Schonenborn .......... | F01D 5/145 415/115 |
| 6,390,789 | B1 * | 5/2002 | Grob ....................... | F04D 17/12 417/251 |
| 8,714,910 | B2 | 5/2014 | Lenderink et al. | |
| 2010/0135769 | A1 | 6/2010 | Kleynhans et al. | |
| 2011/0280710 | A1 | 11/2011 | Mariotti | |
| 2012/0230812 | A1 * | 9/2012 | Jonen ..................... | B01D 45/06 415/13 |

FOREIGN PATENT DOCUMENTS

| | | | | |
|---|---|---|---|---|
| GB | 956 731 A | | 4/1964 | |
| JP | H09 273495 A | | 10/1997 | |
| WO | WO 2007/110378 A1 | | 10/2007 | |
| WO | WO 2010/084422 A2 | | 7/2010 | |
| WO | WO 2011058034 A1 | * | 5/2011 | ............. B01D 45/06 |

* cited by examiner

24/26
37
11
35
36
32
29
31
28
24/25
30
24/27
23
31
31
18
31

24/26
39
11
29
32
31
38
24/25
28
30
23
31
24/27
31
18
31

MULTI-STAGE RADIAL COMPRESSOR UNIT COMPRISING GAS REMOVAL DURING A COMPRESSOR STAGE

CROSS-REFERENCE TO RELATED APPLICATIONS

This is a U.S. national stage of application No. PCT/EP2013/053900, filed on 27 Feb. 2013, which claims priority to the German Application No. 10 2012 204403.5, filed 20 Mar. 2012, the content of both incorporated herein by reference.

BACKGROUND OF THE INVENTION

1. Field of the Invention

The invention relates to a radial compressor unit.

2. Description of the Related Art

From DE 37 29 486 C1 a compressor unit for compressing gas is known, which comprises multiple compressor stages and a drive embodied as an electric motor. According to this prior art, the compressor stages and the drive are arranged in a common, gas-tight housing. In DE 37 29 486 C1 it is proposed to guide compressed gas over a surface cooler in order to cool the compressed gas. Here, the cooling of the compressed gas acts with the help of the surface cooler between two compressor stages.

From DE 10 2007 019 264 A1 it is known to remove compressed gas in the region of a compressor stage of a compressor unit and to use the compressed gas as cooling gas for a component to be cooled. Here, the gas that is removed as cooling gas is to be free of contaminations such as, for example, particles and/or liquids. It is desirable, furthermore, that the removed gas has as high a pressure as possible. In order to remove cooling gas that is as pure as possible from a compressor stage of the compressor unit, it is proposed, according to the prior art according to DE 10 2007 019 264 A1, to remove the cooling gas via a removal channel which, adjacently to an impeller, which is also called rotor, and adjacent to a diffuser section of a flow channel running downstream of the impeller, branches off a wheel lateral space. In this way, relatively pure cooling gas, which contains few contaminations, can be removed but the removed cooling gas however only has a relatively low pressure.

There is a need for a radial compressor unit, on which, in the region of a compressor stage, cooling gas can be removed, which, on the one hand has relatively few contaminations, and, on the other hand a relatively high pressure.

SUMMARY OF THE INVENTION

Starting out from this, it is an object of the invention to create a new type of radial compressor unit.

This object is solved through a radial compressor unit as set forth herein. According to the invention, the cooling gas can be removed in the region of an intermediate wall of the compressor stage from the deflection section and/or the recirculation section of the flow channel of the compressor stage.

Because the cooling gas is removed from the deflection section and/or the recirculation section of the flow channel of the compressor stage in the region of the intermediate wall of the compressor stage, cooling gas on the one hand can be removed and provided with relatively few contaminations and, on the other hand, with an adequately high pressure.

According to a first advantageous further development of the invention, the cooling gas can be removed from the deflection section and/or the recirculation section of the flow channel of the compressor stage, namely via at least one removal pipe projecting into the flow channel and a removal opening positioned adjacent to the intermediate wall.

According to a second advantageous further development of the invention, the cooling gas can be removed from the recirculation section of the flow channel of the compressor stage, namely via at least one removal channel with a removal opening introduced into a front edge or suction side of a guide blade.

With all two above advantageous further developments of the invention, it is possible in a simple manner of design to remove the cooling gas from the deflection section and/or the recirculation section of the flow channel adjacent to the intermediate wall.

BRIEF DESCRIPTION OF THE DRAWINGS

Preferred further developments of the invention are obtained from the following description. Exemplary embodiments of the invention are explained in more detail with the help of the drawings without being restricted to this. In the drawings.

DETAILED DESCRIPTION OF THE PREFERRED EMBODIMENTS

The present invention relates to a radial compressor unit for compressing gas, such as is employed, for example, for the extraction of natural gas in the offshore sector.

Figure 1:
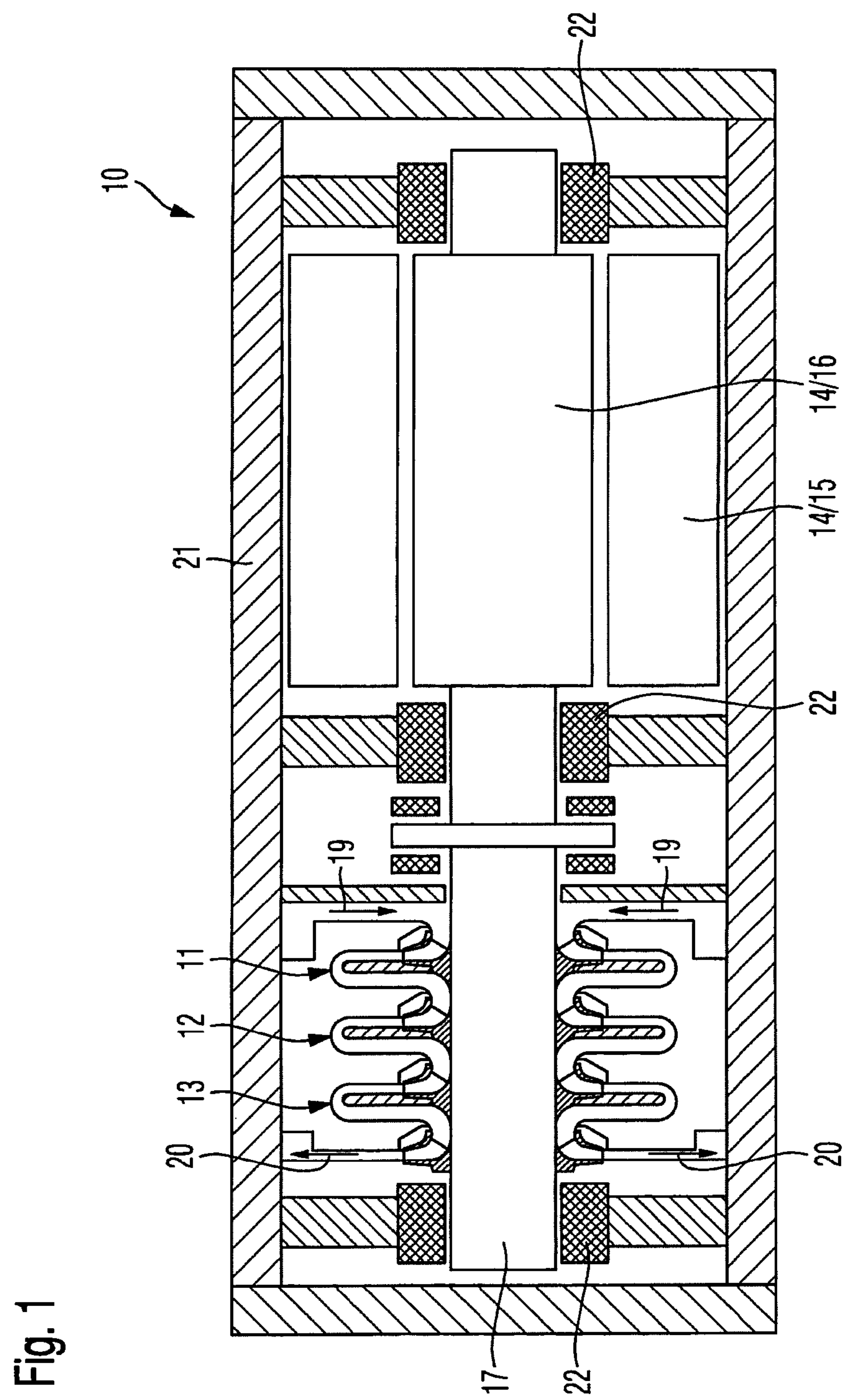
FIG. 1: is a schematic cross section through a radial compressor unit for the compression of gas.

FIG. 1 shows a schematic cross section through a radial compressor unit 10 for the compression of gas, wherein the radial compressor unit 10 has multiple compressor stages 11, and 13, which are driven by a drive 14 embodied as an electric motor, wherein of the drive 14 embodied as electric motor a stator 15 on the one hand and a rotor 16 on the other hand are shown.

The drive 14 drives a shaft 17 of the radial compressor unit 10, wherein with the shaft 17 so-called impellers 18 of the compressor stages 11, 12 and 13 are coupled, so that the impellers 18 of the compressor stages 11, 12 and 13 are driven by the drive 14 of the radial compressor unit 10. The impellers 18 of the compressor stages 11, 12 and 13 are also called rotors.

Seen in flow direction of the gas to be compressed downstream of the impeller 18 of the respective compressor stage 11, 12, 13, a flow channel 24 follows each respective compressor stage 11, 12, 13.

In the illustrated exemplary embodiment, the radial compressor unit 10 of FIG. 1 exemplarily comprises compressor stages 11, and 13, wherein uncompressed gas is fed to compressor stages 11, 12 and 13 as per the arrow 19, and wherein compressed gas is discharged as per the arrow 20. The compressor stages 11, 12 and 13 are connected one behind the other and serve for the step-by-step compression of the gas, wherein the compressor stage 11 can also be described as low-pressure compressor stage, the compressor stage 12 also as medium pressure compressor stage and the compressor stage 13 also as high-pressure compressor stage.

The compressor stages 11, 12 and 13 of the radial compressor unit 10 are received in a common housing 21 together with the drive 14 embodied as electric motor, wherein the shaft 17 is mounted in the housing 21 via bearings 22.

During the operation of the radial compressor unit it is required to cool its components, in particular the drive 14, for the purpose of which compressed gas as cooling gas can be removed from a compressor stage of the radial compressor unit 10 and can be conveyed for cooling the assembly to be cooled, in particular of the drive 14 to be cooled, in the direction of the assembly to be cooled.

It is important that the cooling gas is removed from a compressor stage such that the cooling gas, on the one hand, has few contaminations and, on the other hand, has an adequately high pressure in order, on the one hand, not to contaminate the assembly to be cooled through the cooling gas and, on the other hand, ensure as effective a cooling of the assembly to be cooled as possible.

Figure 2:
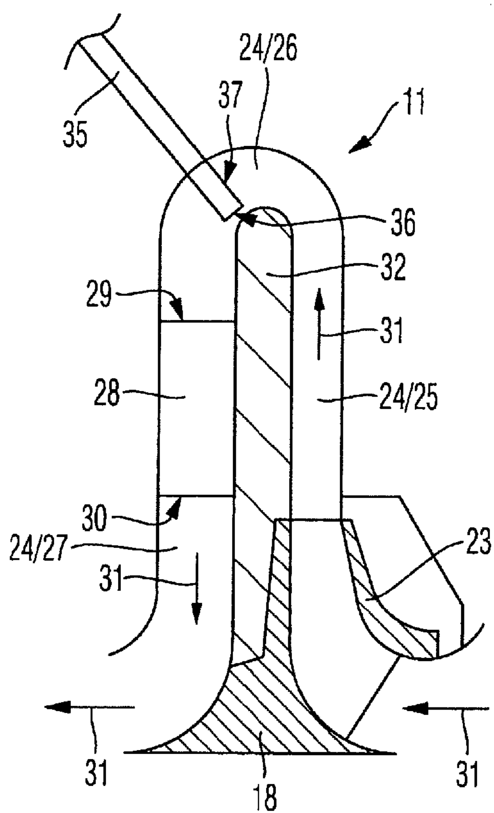
FIG. 2: is a detail from a radial compressor unit according to the invention in the region of a compressor stage of the same according to a first version of the invention.
Figure 3:
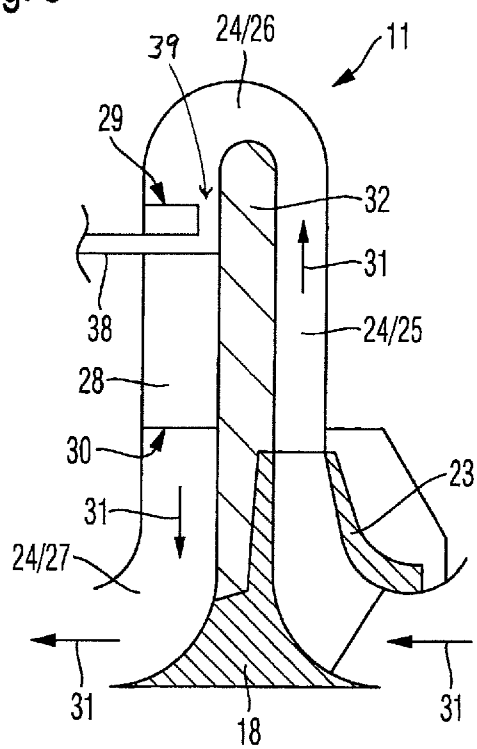
FIG. 3: is a detail from a radial compressor unit according to the invention in the region of a compressor stage of the same according to a second version of the invention.

FIGS. 2 to 3 each show details of a radial compressor 10 according to the invention in the region of one of the compressor stages, namely of the compressor stage 11. In FIGS. 2 to 3, on the one hand, the impeller 18 of the respective compressor stage 11 is shown, which comprises rotor blades 23, and the flow channel 24 that follows, seen in flow direction of the gas to be compressed downstream of the impeller 18, is shown, wherein the flow channel 24 comprises multiple sections, namely a diffuser section 25 directly following the impeller 18, a deflection section 26 following the diffuser section 25 and a recirculation section 27 following the deflection section 26. In the recirculation section 27, fixed guide blades 28 are positioned, of which on, the one hand an inlet edge 29, and, on the other hand, an outlet edge 30 are schematically shown. The flow direction through the compressor stage 11 is visualised by arrows 31. The diffuser section 25, the deflection section 26 and the recirculation section 27 of the flow channel 24 of the compressor stage 11 are radially bounded on the inside at least in sections by an intermediate wall 32 on the stator side, hub-side.

In order to now remove as pure as possible a cooling gas with an adequately high pressure from the compressor stage 11, it is proposed, according to the invention, to remove the cooling gas adjacent to the intermediate wall 32 of the compressor stage 11 from the deflection section 26 and/or the recirculation section 27 of the flow channel 24 of the compressor stage 11 and feed it to the assembly to be cooled.

FIG. 2 shows a first version of the invention, in which the cooling gas is removed from the flow channel 24 of the compressor stage 11, namely via at least one removal pipe 35 projecting into the flow channel 24 in the region of the flow channel 24 located at a portion of the deflection section 26 leading to the recirculation section 27, the removal pipe 35 having a removal opening 36 positioned adjacent to the intermediate wall 32. The removal opening 36 of the removal pipe 35 via which the cooling gas is removed from the compressor stage 11 in the region of the intermediate wall 32, is positioned in this case in a region of the deflection section 26 leading to the recirculation section 27 so that the cooling gas is removed from the flow channel 24 in this region.

The, or each, removal pipe 35 projecting into the flow channel 24 comprises a profiled, flow-guiding outer wall at least on the section 37, which projects into the flow channel 24 in order to exclude impairment of the flow through the removal pipe 35 projecting into the flow channel.

A further version of the invention is shown by FIG. 3. In FIG. 3 the cooling gas is removed from the recirculation section 27 of the flow channel 24 of the compressor stage 11, namely via at least one removal channel 38, whose removal opening 39 is introduced into a front edge 29 of a guide blade 28. Here, as is evident from FIG. 3, this removal opening 39 for the removal channel 38 introduced into the front edge of the guide blade 28 is introduced into the front edge 29 of the guide blade 28 adjacent to the intermediate wall 32.

With all versions according to the invention, cooling gas can be removed from a compressor stage 11 in such a manner that the cooling gas comprises few contaminations and an adequately high pressure. Because of this, effective cooling of an assembly of the radial compressor unit 10 to be cooled is possible on the one hand and on the other hand there is no risk that the assembly to be cooled is contaminated by the cooling gas.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A radial compressor unit for the compression of gas, comprising:

- a plurality of compressor stages (11, 12, 13), each compressor stage (11, 12, 13) having:
  - an intermediate wall (32),
  - an impeller (18) with rotor blades (23),
  - a flow channel (24) arranged, with respect to a flow direction of the gas to be compressed, downstream of the impeller (18), the flow channel (24) having:
    - a diffuser section (25) directly following, in the flow direction, the impeller (18),
    - a deflection section (26) following, in the flow direction, the diffuser section (25), and
    - a recirculation section (27) with multiple guide blades (28), the recirculation section (27) following, in the flow direction, the deflection section (26), wherein the diffuser section (25), the deflection section (26) and the recirculation section (27) are bounded on the inside by the intermediate wall (32), and
- a removal pipe (35) having a projecting section (37) projecting into the flow channel (24) and having, at an end of the projecting section (37) within a flow path of the flow channel (24), a removal opening (36) arranged in a region of the flow channel (24) proximate the deflection section (26) and adjacent to the intermediate wall (32), the removal pipe (35) and removal opening (36) being configured and arranged such that compressed gas, as cooling gas, is removed, by the removal pipe (35), from the flow channel (24), in a region of the flow channel (24) adjacent to the intermediate wall (32) so as to remove cooling gas from the region of the flow channel (24) at which the removal opening (36) is located.

* * * * *